Aug. 19, 1941.　　　　　H. LUTZ　　　　　2,253,438
TRACTOR WITH GAS PRODUCER ARRANGED THEREON
Filed May 24, 1938　　　3 Sheets-Sheet 1
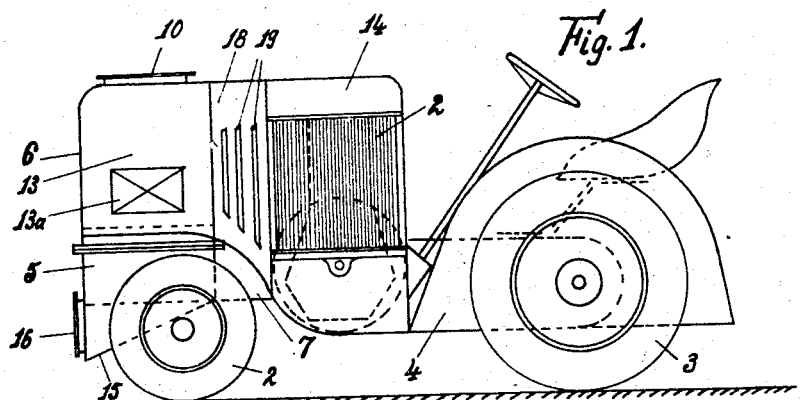
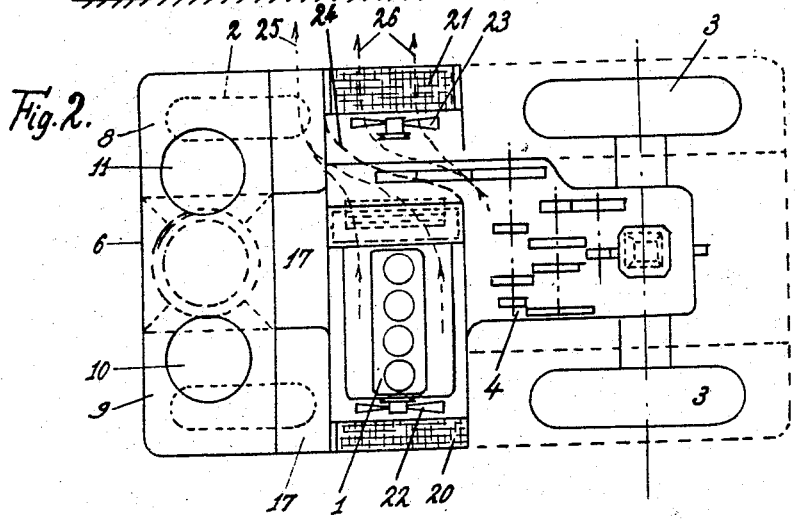
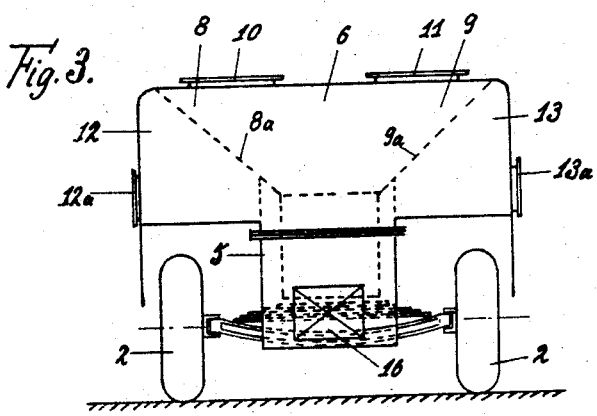
Inventor:
Hans Lutz Aug. 19, 1941.   H. LUTZ   2,253,438
TRACTOR WITH GAS PRODUCER ARRANGED THEREON
Filed May 24, 1938   3 Sheets-Sheet 2
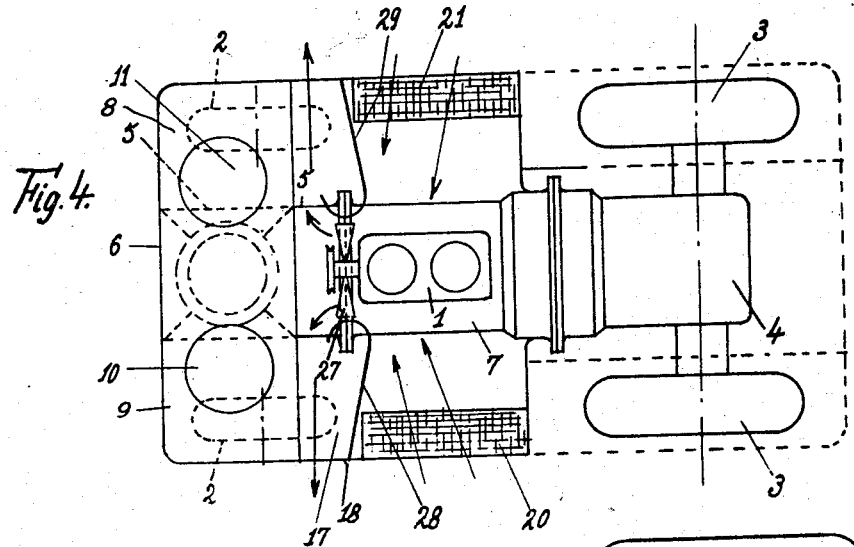
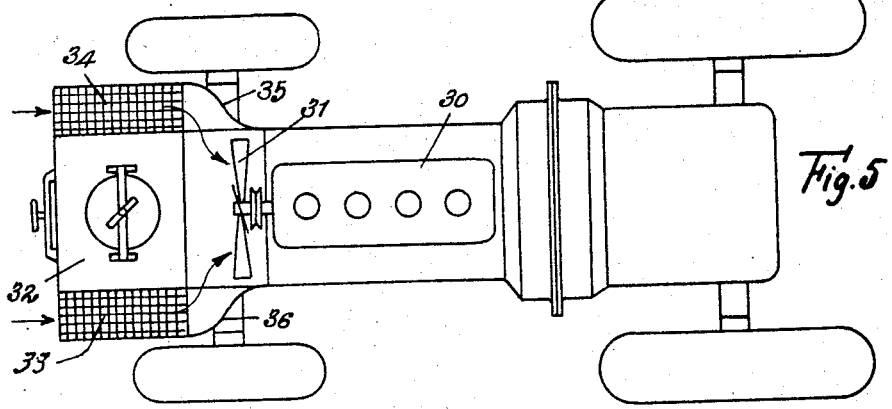
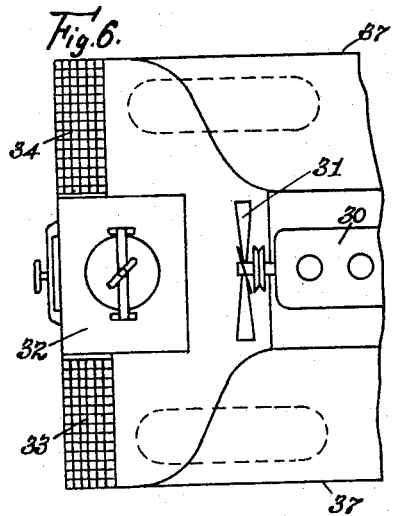
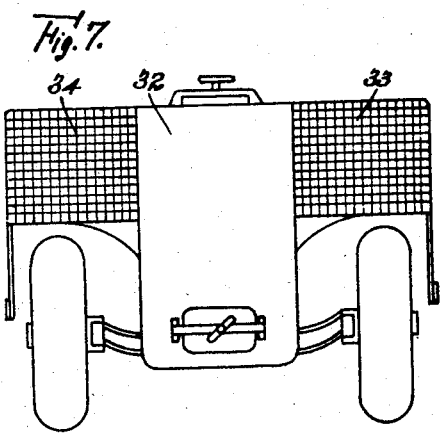
Inventor:
Hans Lutz Aug. 19, 1941.  H. LUTZ  2,253,438
TRACTOR WITH GAS PRODUCER ARRANGED THEREON
Filed May 24, 1938  3 Sheets-Sheet 3
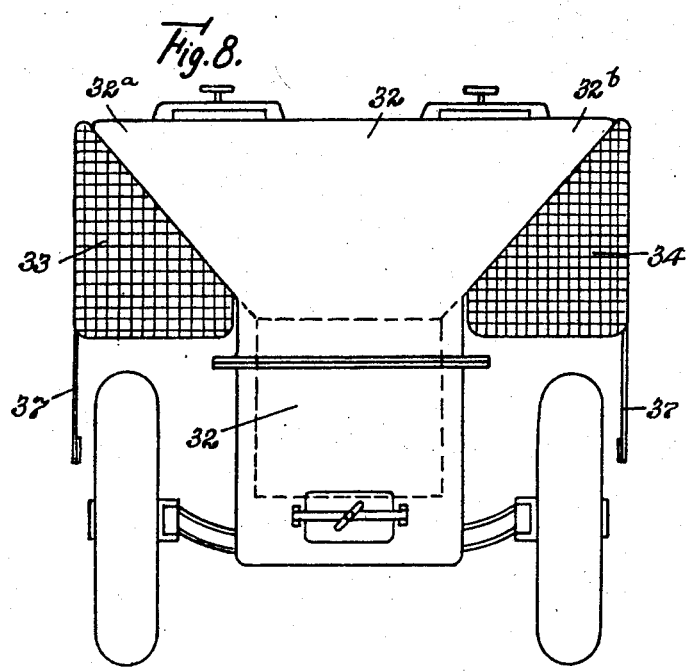
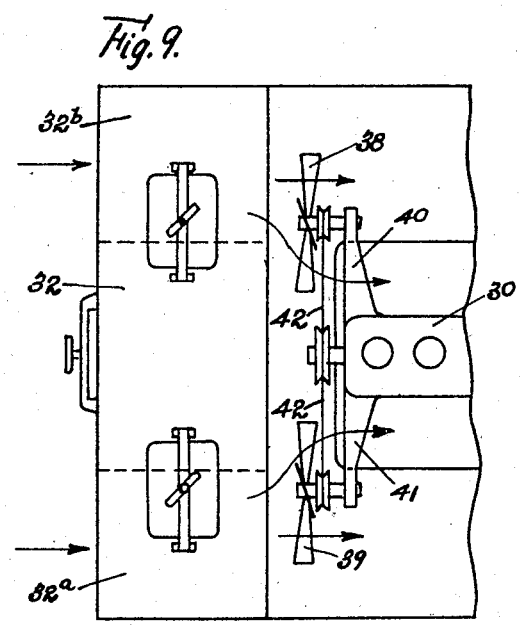
Inventor:
Hans Lutz Patented Aug. 19, 1941

2,253,438

UNITED STATES PATENT OFFICE 2,253,438

TRACTOR WITH GAS PRODUCER ARRANGED THEREON

Hans Lutz, Berlin-Charlottenburg, Germany

Application May 24, 1938, Serial No. 209,756
In Germany May 27, 1937

1 Claim. (Cl. 180—1)

This invention relates to a motor vehicle, especially a motor tractor, with gas producer arranged thereon whose gas serves as fuel for the engine of the tractor or vehicle.

According to the invention the gas producer is suspended on the vehicle in front of the engine. As there is generally a radiator in front of the engine, the arrangement of a gas producer in front of the radiator would result, on the one hand, in an exceptionally long construction and, on the other hand, the front wheel axle would be very heavily loaded and the rear wheels relieved by a tilting moment, which is unfavourable especially in the case of tractors as the rear wheels would lose some of their gripping power. In order to avoid, on the one hand, a long construction and, on the other hand, a relieving of the rear wheels, it is proposed, according to the invention, to remove the radiator from its place and to suspend in its place a gas producer on the vehicle, so that this producer hangs only a short distance in front of or above the front wheel axle, with the result that a tilting moment for relieving the rear wheels is avoided.

As another possibility of solving the problem it is proposed to mount the engine transversely and to suspend the gas producer in front of this transversely arranged engine related to the longitudinal axis of the engine. By this construction it is possible to obtain a very short construction, and very much space is won on the front side of the vehicle or tractor for accommodating the gas producer.

Several embodiments of the invention are illustrated diagrammatically in the accompanying drawings in which:

Fig. 1 shows a tractor with gas producer in side elevation.

Fig. 2 is a top plan view of the Fig. 1.

Fig. 3 is an end elevation of the tractor shown in Figs. 1 and 2.

Fig. 4 shows a modified form of construction in top plan view.

Fig. 5 is the top plan view of yet another form of construction.

Fig. 6 is a part plan view of a slightly modified construction of the arrangement shown in Fig. 5.

Fig. 7 is an end view of Fig. 6.

Fig. 8 is an end view of a gas producer with lateral extensions and radiators arranged thereunder.

Fig. 9 is a part plan view of Fig. 8.

According to Figs. 1 to 3 the tractor engine 1 is mounted transversely to the longitudinal axis of the vehicle between the front and rear wheels 2 and 3, so that the gear accommodated in the case 4 can consist entirely of spur wheels. The gas producer comprising a lower part 5 and an upper part 6 is mounted in front of the engine 1 so that the lower part is located between the front wheels 2 in front of or partly above the front wheel axle. The lower part 5 of the gas producer, the engine block 7 and the gear case 4 are cast in one piece as a tractor body aggregate, or the parts 5, 7 and 4 are separate castings connected by flanges cast on these parts.

To increase its capacity the gas producer has lateral extensions 8 and 9 with inwardly sloping bottoms 8a and 9a respectively and two removable covers 10 and 11. The extensions 8 and 9, the receptacles 12 and 13 constructed as purifiers, water tanks and the like arranged partly under the extensions, extend laterally to above the front wheels 2 and lie in the side planes of the covering of the engine 14. The gas producer 5, 6 is also not higher than the engine housing 14, so that the gas producer and engine appear as an organic composite construction.

The receptacles 12 and 13 may be rendered easily accessible by doors 12a and 13a. The lower part 5 of the producer has an inwardly sloping bottom 15 and an ash-removing door 16 in its end wall through which door the ash slipping down along the inwardly sloping bottom in forward direction can easily be removed.

In order to prevent heat radiation from the gas producer 5, 6 to the engine 1, an insulating gap 17 (Fig. 2) extends transversely between these aggregates, this gap being surrounded by a covering 18 with lateral ventilation slots 19. However, some other insulating material or insulating walls may be interposed between the producer and the engine.

Opposite the engine radiator 20, a similarly constructed gas radiator 21 is arranged for utilizing the space and for symmetrical reasons and cools the producer gas to a low temperature before it is fed to the engine 1. Air is forced through the two radiators 20 and 21 by separate fans 22 and 23, as there is no travelling draught cooling owing to the engine being transversely arranged and owing to the slow speed at which the tractor travels. To prevent the two fans 22 and 23 from mutually influencing one another, a guide plate 24 serving as partition is arranged between them. The guide plate 24 extends diagonally in curved shape between the engine and the fan 23 so that the fan 23 sucks in air on the end at which the driver's seat is located and forces it through the radiator 21 in the direction of the arrows 26, whereas the fan 22 sucks air through the radiator 20 from the side of the tractor which air brushes along the engine 1 and then passes along the guide plate 24 through a portion of the space 17, and passes out on the other side of the tractor in the direction of the arrow 25, thereby incidentally increasing the insulating effect of the gap 17. The fan 23 of the gas radiator 21 acts in the opposite direction, in that it forces the air sucked in in the direction of the arrow 26, outwards through the cooler 21.

According to the construction illustrated in Fig. 4 the engine 1 is arranged in the longitudinal axis of the tractor and the radiators 20 and 21 laterally thereof. These radiators are flush with the upper lateral extensions 8 and 9 of the gas producer located in front of the engine. In this instance the air is sucked through the radiators 20 and 21 in the direction of the arrows by a fan 27 arranged in front of the engine in known manner and is conducted outwards by the guide plates 28 and 29 over the gap 17 through slots in the covering 18.

According to the examples illustrated in Figs. 5 to 7 the engine radiator 33 and the gas radiator 34 are arranged laterally of the gas producer 32 located in front of the engine 30. As the fan 31 rotates, the air flows through the radiators 33 and 34 arranged either in longitudinal direction or in transverse direction according to Figs. 6 and 7, and is fed to the fan 31 by guide plates 35 and 36. According to Figs. 6 and 7 the radiators 33 and 34 extend to above the front wheels of the tractor and are flush with the sheet metal covering 37.

According to Figs. 8 and 9 the gas producer 32 is again provided with lateral extensions 32a and 32b extending over the front wheels. The engine radiator 33 and gas radiator 34 are arranged under these extensions and their cross sectional shape corresponds to the space here available. In this instance separate fans 38 and 39 are provided one for each of the radiators. These fans are mounted on brackets 40 and 41 and driven from the engine shaft through the intermediary of a common driving belt 42 circulating along a triangular path. However, a single fan with corresponding guide plates might also be used in this construction and arranged as in Figs. 5 and 6.

I claim:

A motor tractor comprising in combination with the under frame, an engine arranged transversely on the under frame at a short distance behind the gas producer relatively to the longitudinal direction of the under frame, an engine radiator arranged at one end of said engine, a gas producer radiator arranged at the other end of the engine, two fans at the inner side of each of said radiators, and a curved guide plate between the engine and the fan at the inner side of the gas producer radiator, the fan at the inner side of the engine radiator adapted to draw air through said engine radiator and force it over said engine and along the inner side of said guide plate through the gap between the engine and gas producer, and the other fan adapted to draw air from the rear end of the vehicle against the outer side of said guide plate and force it through the gas producer radiator.

HANS LUTZ.